US009278710B2

United States Patent
Bokil et al.

(10) Patent No.: US 9,278,710 B2
(45) Date of Patent: Mar. 8, 2016

(54) SYMMETRIC STEER LINKAGE

(75) Inventors: Vijay Bokil, Troy, MI (US); Bruce C. Arnold, Whitmore Lake, MI (US); Geoffrey Lawrence Gordon, Novi, MI (US); Jeremy A. Rawlings, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 577 days.

(21) Appl. No.: 12/715,770

(22) Filed: Mar. 2, 2010

(65) Prior Publication Data

US 2011/0215543 A1    Sep. 8, 2011

(51) Int. Cl.
*B62D 7/16* (2006.01)
*B62D 7/20* (2006.01)

(52) U.S. Cl.
CPC ... *B62D 7/16* (2013.01); *B62D 7/20* (2013.01)

(58) Field of Classification Search
CPC ............ B60G 3/20; B60G 3/22; B60G 7/001; B60G 7/02; B60G 9/003; B60G 9/02; B60G 2200/141; B60G 2200/31; B60G 2200/462; B60G 2200/464; B60G 2204/143; B60G 2200/148; B60G 2204/44; B60G 2204/61; B62D 17/00; B62D 3/02; B62D 7/16; B62D 7/20; B62D 7/163; B62D 5/26
USPC ......... 280/124.134, 124.116, 93.502, 93.507, 280/93.51, 86.753, 124.113, 89.12, 89.13
See application file for complete search history.

(56) References Cited

U.S. PATENT DOCUMENTS

| | | | | |
|---|---|---|---|---|
| 2,153,083 A | * | 4/1939 | Griswold | 280/86.753 |
| 2,841,412 A | * | 7/1958 | Mineck | 280/93.509 |
| 4,093,388 A | * | 6/1978 | MacArthur | 403/46 |
| 4,162,859 A | * | 7/1979 | McAfee | 403/75 |
| 4,625,982 A | * | 12/1986 | Matsuo | 280/93.506 |
| 4,869,527 A | | 9/1989 | Coddens | 280/663 |
| 5,236,210 A | * | 8/1993 | Ogiso | 280/124.139 |
| 5,401,049 A | * | 3/1995 | Richardson | 280/124.134 |
| 5,529,316 A | * | 6/1996 | Mattila | 280/93.51 |
| 5,603,583 A | * | 2/1997 | Jackson | 403/320 |
| 5,651,561 A | | 7/1997 | Tandy, Jr. et al. | 280/661 |
| 5,722,504 A | * | 3/1998 | Gaetani | 180/411 |
| 5,765,844 A | * | 6/1998 | Wood | 280/93.509 |
| 5,820,147 A | * | 10/1998 | Rohweder et al. | 280/93.51 |
| 6,086,075 A | * | 7/2000 | O'Bryan et al. | 280/89.12 |
| 6,087,943 A | * | 7/2000 | Bailey | 340/576 |
| 6,386,564 B1 | * | 5/2002 | Kincad et al. | 280/93.51 |
| 7,182,544 B2 | * | 2/2007 | Irrer | 403/43 |
| 7,350,792 B1 | * | 4/2008 | Garman | 280/93.51 |
| 7,416,198 B2 | * | 8/2008 | Blaszynski | 280/89.12 |
| 2002/0053477 A1 | * | 5/2002 | Karpik | 180/182 |
| 2002/0171218 A1 | * | 11/2002 | Bell | 280/93.512 |

OTHER PUBLICATIONS

Massachusetts Institute of Technology—2004-01-0811 Axiomatic Design of Automobile Suspension and Steering Systems: Proposal for a novel six-bar suspension Hrishikesh V. Deo, Nam P. Suh.
Integrated Publishing the Most Informative Site on the Internet (2 pages).

* cited by examiner

*Primary Examiner* — James English
(74) *Attorney, Agent, or Firm* — L.C. Begin & Associates, PLLC

(57) ABSTRACT

An assembly is provided comprising a twin I-beam front suspension system and a parallelogram steering linkage operatively coupled to the suspension system. A vehicle incorporating the assembly is also disclosed.

17 Claims, 5 Drawing Sheets

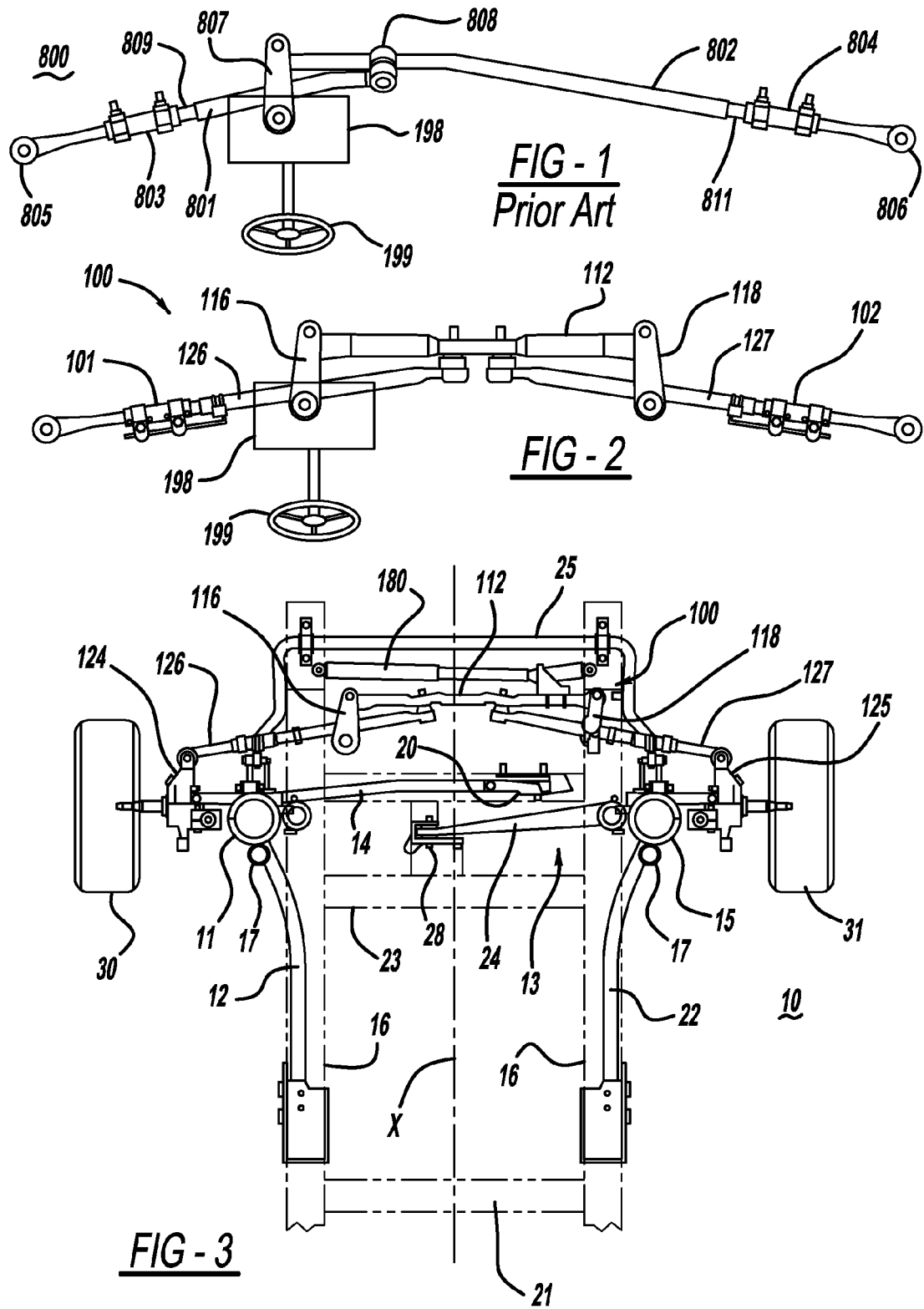

SYMMETRIC STEER LINKAGE

BACKGROUND OF THE INVENTION

The present invention relates to vehicle steering linkages usable in conjunction with a twin I-beam vehicle suspension system and, more particularly, to a lateral steering linkage usable in conjunction with the twin I-beam vehicle suspension.

For purposes of vehicle handling, it is desirable that vehicle wheel toe changes due to driving conditions be controlled. Ideally, wheel toe changes produced during in-phase wheel motion or ride motion (i.e., during simultaneous up and down motion of both front wheels) should produce no net steer effect in either the right or left directions. Also, it is desirable that wheel toe changes produced during both out-of-phase wheel motion or roll motion (i.e., up and down motion of each separate wheel) produce a net steer effect tending to move the wheels out of the turn direction (a net understeer effect).

Vehicles incorporating a twin I-beam (TIB) suspension system typically employ a steering system which includes an asymmetric steering linkage (for example, a Haltenberger steering linkage, as seen in FIG. 1). One limitation of the Haltenberger steering linkage as used with the TIB suspension is its inability to provide satisfactory wheel toe response curves during both in-phase wheel motion and out-of-phase wheel motion. In a steering system using a Haltenberger linkage, to prevent undesirable wheel toe changes during ride motion, it is necessary to configure the steering geometry so as to minimize or prevent any wheel toe change. However, when the steering geometry is designed to produce zero or minimum toe change during ride motion, the toe changes due to wheel roll motion are adversely affected such that a kinematic roll oversteer effect is produced. This results in a reduction of the contribution made by the steering system to overall vehicle understeer characteristics, thereby degrading the handling characteristics of the vehicle.

SUMMARY OF THE INVENTION

In one aspect of the embodiments of the present invention, an assembly is provided including a twin I-beam front suspension system and a lateral steering linkage operatively coupled to the suspension system.

In another aspect of the embodiments of the present invention, a linkage member for a lateral steering linkage is provided. The linkage member includes spaced apart first and second coupling features located therealong. Each coupling feature enables attachment thereto of a means for operatively coupling the linkage member to an associated vehicle wheel. An effective spacing between the first and second coupling features is about 210 mm.

In another aspect of the embodiments of the present invention, a vehicle is provided including a twin I-beam front suspension system and a left front wheel and a right front wheel operatively coupled to the suspension system. Means operatively coupled to the suspension system and to the left and right front wheels provides substantially equal wheel toe angle changes in the left front wheel and the right front wheel responsive to a given set of driving conditions.

BRIEF DESCRIPTION OF THE DRAWINGS

In the drawings illustrating embodiments of the present invention:

FIG. 1 is a view of a known Haltenberger-type steering linkage.

FIG. 2 is a view of a lateral steering linkage in accordance with an embodiment of the present invention.

FIG. 3 is a top view of a twin I-beam front suspension system coupled to the steering linkage shown in FIG. 2.

DETAILED DESCRIPTION

Figure 4:
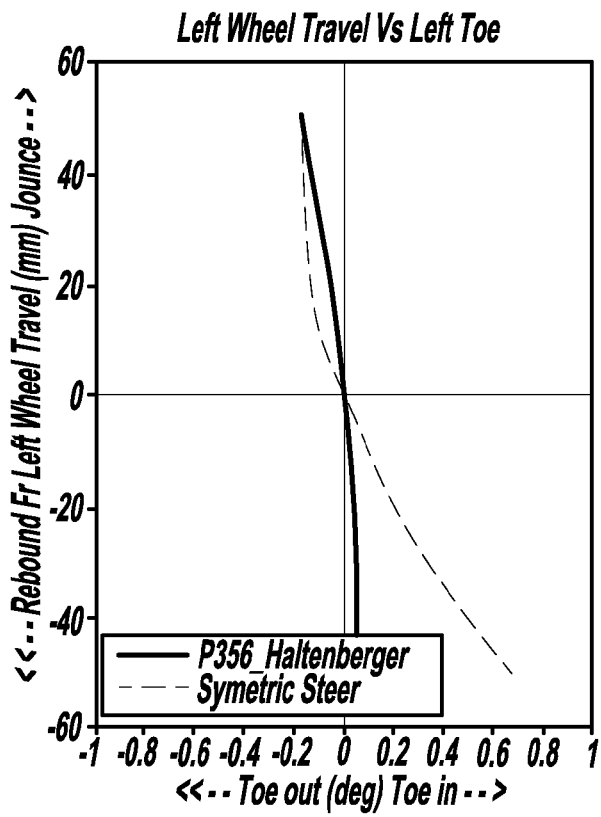
FIGS. 4-10 show results of optimization studies on a modeled TIB suspension-lateral linkage combination in accordance with an embodiment of the present invention.

FIG. 1 shows one version of a conventional Haltenberger steering linkage 800 typically used in vehicles incorporating TIB suspension. The linkage includes a first member 801 and a second member 802 coupled to the first member at a location 808 using a suitable coupling mechanism. Member 801 incorporates or is coupled to a tie rod 809 including an adjustment sleeve 803 enabling adjustment of the tie rod length. Similarly, member 802 incorporates or is coupled to a tie rod 811 including an adjustment sleeve 804 enabling adjustment of the tie rod length. Linkage 800 is coupled to associated steering knuckles of vehicle wheels (not shown) at tie rod ends 805 and 806. A Pitman arm 807 is coupled to a steering mechanism such as a steering wheel 899, and is also coupled to second member 802 using a ball joint or other suitable connection. Rotation of the steering wheel produces an associated rotation of the Pitman arm 807, causing movement of members 801 and 802 relative to each other to manipulate the steering knuckles.

Referring first to FIGS. 2 and 3, there is shown an assembly 10 in accordance with an embodiment of the present invention. The assembly includes an embodiment of a twin I-beam front suspension system 13 for a vehicle, and a lateral steering linkage (generally designated 100) coupled to the suspension system 13. Opposing sides of a vehicle frame 16 are joined together by frame cross members 21 and 23. An engine (not shown) is disposed over the frame cross member 23. Coil springs 11 and 15 and front shock absorbers 17 are positioned on respective sides of the vehicle frame 16. Two front I-beam axles 14 and 24 are situated beneath the vehicle frame 16 and are connected to the vehicle frame by associated pivot bushings 20 and 28. The front axle 24 is disposed rearward of the front axle 14. The suspension system also includes a stabilizer bar 25 to provide roll stiffness.

In the embodiment shown in FIG. 3, a radius arm 12 on the left side of the vehicle frame 16 has a forward end and a rearward end. The forward end is adapted to be connected in a conventional manner to the front axle 14. The rearward end is connected to the vehicle frame 16 in a known manner using a suitable connecting mechanism (for example, a bushing). Similarly, a radius arm 22 on the right side of the vehicle also has a forward end and a rearward end, like the radius arm 12. The forward and rearward ends of the radius arm 22 are adapted to be connected to the front axle 24 and the vehicle frame 16, respectively, in a similar manner as the radius arm 12 connects to the front axle 14 and vehicle frame 16. Bushings 20 and 28 connecting the radius arms to the vehicle frame may be silent block type bushings, for example, as described in U.S. Pat. No. 5,651,561, incorporated herein by reference. Alternatively, other types of bushings or bearings may be used.

As used herein, the terms "lateral steering linkage" and "lateral linkage" will be defined as a linkage including a first member having an axis oriented generally laterally with respect to the vehicle (i.e., generally perpendicular to a fore-aft axis along which the vehicle travels when the wheels are pointing straight ahead of the vehicle). A suitable first coupling mechanism operatively couples the first member to a steering mechanism (such as a steering wheel), and a suitable second coupling mechanism operatively couples the first member to a relatively stationary portion of the vehicle (such as the frame or chassis) such that the first member moves side-to-side or laterally in response to steering inputs from the steering mechanism, and such that the lateral orientation of the first member-axis is maintained during sideways movement of the first member. One embodiment of a lateral linkage is the parallelogram steering linkage described below. However, other types of lateral steering linkages are also contemplated for use in embodiments of the present invention. For example, a rack-and-pinion type steering linkage employing a laterally-moving rack gear is another type of lateral linkage that may be optimized and used for the purposes described herein. In this embodiment, the first member comprises the rack gear. The first coupling mechanism would comprise opinion gear connected to a steering wheel and engaging the rack gear. The second coupling mechanism would comprise a vehicle-mounted track or guide in which the rack gear moves side-to-side responsive to inputs from the steering mechanism.

Referring to FIGS. 2 and 3, a lateral steering linkage 100 is operatively coupled to the twin I-beam suspension system 13. In one embodiment, the lateral steering linkage is a parallelogram steering linkage system including center link 112 that is connected to the frame or chassis of the vehicle by two pivoting members, such as a Pitman arm 116 and an idler arm 118. The Pitman arm is coupled to a gear housing 198 attached to the steering wheel 199 and mounted to the vehicle frame. The center link 112 has a longitudinal axis aligned generally laterally with respect to a fore-aft axis X of the vehicle.

The center link 112 includes coupling features enabling attachment thereto of a means for operatively coupling the linkage member to one or more of associated vehicle wheels 30 and 31. In one embodiment, the coupling features are holes formed along the center link for receiving ball joints or other suitable bearings or coupling mechanisms therein. Alternatively, a coupling feature may comprise a ball joint already mounted in an opening formed in the center link. The center link 112, Pitman arm 116, idler arm 118, and a vertical plane in which the rotational centers of the Pitman arm and idler arm reside combine to form a parallelogram so that the center link 112 moves laterally or sideways with respect to a fore-aft axis of the vehicle in response to steering inputs from steering wheel 199, which operates steering gear in gear housing 198 to rotate the pitman arm 116. The Pitman arm 116 and the idler arm 118 are connected to the center link 112 by ball joints and the idler arm 118 is connected to the vehicle chassis by a suitable pin or pivot joint. The idler arm 118 is thus connected via the center link 112 to a rotatable output of the steering gear which is mounted on the chassis.

In the embodiment shown in FIG. 3, end portions of the center link 112 are each connected to an associated steering knuckle 124, 125 by a respective connecting member or tie rod 126, 127. The tie rods 126, 127 may have fixed lengths, or one or more of the tie rods may be formed from a pair of segments connected by an associated adjustment sleeve 101, 102 as known in the art, to enable adjustment of the effective length of the tie rod. In a particular embodiment of the present invention, tie rods 126 and 127 are substantially straight. Each tie rod 126 is connected to the center link 112 and to one of the steering knuckles 124 by a suitable low friction, lash free ball joint mechanism, for example. If desired, a steering damper 180 may be connected in a conventional manner between the vehicle frame 16 and the center link 112 for heavy-duty applications.

As defined herein, the term "effective length" as applied to features of any of tie rods 126, 127 is understood to mean the spacing between the locations along the tie rod at which the tie rod is coupled to a steering knuckle and the first member or center link 112. This spacing may be measured as the distance between the ball centers of ball joints connecting the tie rod to other elements of the, for example. Similarly, an "effective spacing" between any two features is understood to designate the spacing between the locations of the features (as defined by, for example, the centerlines of holes or the distance between ball centers of ball joints). Also, as defined herein, the term "tie rod" encompasses the tie rod structures described in detail herein, whether adjustable or non-adjustable, as well and any comparable structure which performs the function of operatively coupling the center link to a steering knuckle.

The steering knuckles 124 and 125 are typically pivotally connected by ball joints to moveable members of the twin I-beam suspension system so that the front wheels 30 and 31 can move up and down as well as turn to steer the vehicle. Thus, each of suspension system axles 14 and 24 is operatively coupled to an associated one of vehicle wheels 30 and 31 having an associated one of steering knuckles 124 and 125 coupled thereto. In turn, each steering knuckle is coupled to the steering linkage by an associated one of tie rods 126 and 127.

In operation of the steering linkage, and as is known in the art, rotation of a steering wheel 199 turns a sector shaft (not shown) through a steering gear in a gear housing 198. Rotation of the sector shaft produces rotation of the Pitman arm 116 which, in turn, produces lateral motion of the first member or center link 112. The front wheels 30 and 31 are turned in response to lateral movements of the center link 112 via the tie rods 126 and 127 that connect the center link 112 to the steering knuckles 124 and 125.

Wheel toe is the angular position of a front wheel with respect to a vertical longitudinal plane of the vehicle at zero steering input. Ideally the wheel toe is zero when the steering input is zero so that the vehicle tracks in a straight line. The wheel toe for each front wheel may be adjusted by adjusting the effective length of the associated tie rod 126 or 127 while the tie rod is connected in the steering linkage system.

In a vehicle incorporating TIB suspension system, it has been found possible to achieve wheel toe curves that are substantially the same for both front wheels, by coupling a lateral steering linkage having a specific geometry to the twin I-beam suspension system. It is desirable to determine positions in space for the ball joint connections that meet system packaging requirements and enable the desired wheel toe curves to be achieved. The system packaging requirements define how the steering linkage and its elements must either fit within voids between other vehicle components or be routed around other vehicle components.

One aspect of this geometry is the general positioning of the ball joints connecting the tie rods 126, 127 to center link 112 generally inboard of, or between, the ball joints connecting the Pitman arm 116 and idler arm 118 to center link 112.

Another aspect of this geometry is the general positioning of the mechanism (such as a ball joint) coupling the laterally-moving first member to a first connecting member (such as a tie rod), the mechanism coupling the connecting member to a first vehicle wheel, and the entire first connecting member itself to a first side of a vehicle fore-aft axis (such as axis X shown in FIG. 3). Similarly, the mechanism coupling the laterally-moving first member to a second connecting member, the mechanism coupling the connecting member to a second vehicle wheel, and the entire second connecting member itself is positioned on a second side of the vehicle fore-aft axis opposite from the first side. For example, as seen in FIG. 2, the ball joints connecting tie rod 126 to steering knuckle 124 and to center link 112 are positioned such that the entire tie rod 126 and both of the ball joints are on the same side of the vehicle X axis as knuckle 124. Similarly, the ball joints connecting tie rod 127 to steering knuckle 125 and to center link 112 are positioned such that the entire tie rod 127 and both of the connecting ball joints are on the same side of the vehicle X axis as knuckle 125.

Another aspect of this geometry is the positioning in space of the ball joint connections between the tie rods 126, 127 and the center link 112, the ball joint connection between Pitman arm 116 and center link 112, and the ball joint connection between the idler arm 118 and the center link.

Computer optimization was employed to determine the spatial x, y, and z coordinates of the ball joint connections. Design constraints for the optimization included parameters relating to the available packaging space, dimensions relating to wheel travel during jounce, rebound, and roll, and wheel turn angles. ADAMS design and simulation software was used to simulate in-phase wheel motion and out-of-phase wheel motion. Outputs for the optimization included the front left wheel toe and front right wheel toe. Once the x, y, and z coordinates of the ball joint connections are determined, the lengths of tie rods 126 and 127 can be calculated. Adjustment sleeves 101 and 102 may be used to permit adjustment of the tie rod lengths, in a manner known in the art.

Figure 11:
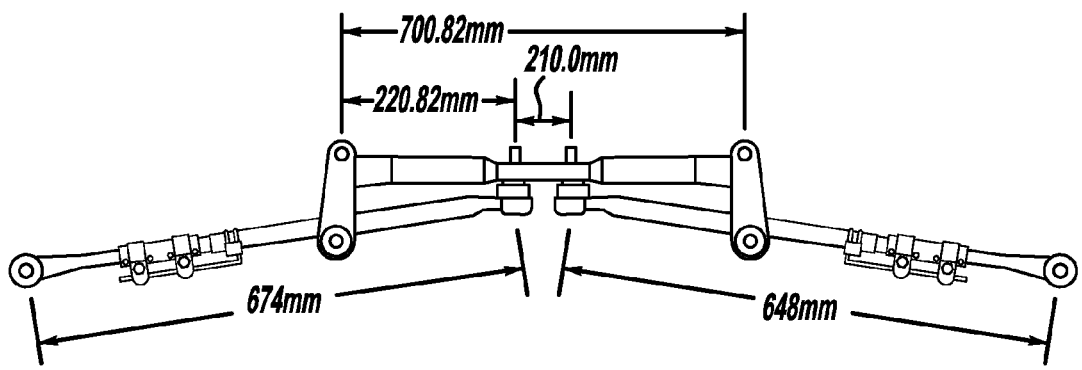
FIG. 11 shows an optimized lateral steering linkage in accordance with a particular embodiment of the present invention.

FIG. 11 shows several linkage dimensions for a particular embodiment of the lateral linkage. As shown, the embodiment in FIG. 11 has the same general configuration as the linkage shown in FIG. 2. The dimensions were determined from a series of optimization runs. As seen in the drawing, the effective spacing between the ball joint connecting center link 112 to tie rod 126 and the ball joint connecting center link 112 to Pitman arm 116 is about 220 mm. The effective spacing between the ball joint connecting center link 112 to tie rod 126 and the ball joint connecting center link 112 to tie rod 127 is about 210 mm. The effective spacing between the ball joint connecting center link 112 to Pitman arm 116 and the ball joint connecting center link 112 to idler arm 118 is about 700 mm. The effective length of tie rod 126 is about 674 mm. The effective length of tie rod 127 is about 648 mm.

Results of the computer optimization for one embodiment of the TIB suspension-parallelogram linkage combination are shown in FIGS. 4-10.

As used herein, the term "roll angle" refers to the angle a vehicle rolls about a fore-aft axis of the vehicle extending through the vehicle center of gravity while negotiating a turn. The fore-aft axis of the vehicle is an axis extending in the direction the vehicle would proceed when moving straight ahead, with the wheels straightened.

Also, as used herein, the term "steering angle" of a wheel refers to the angle between the fore-aft axis if the vehicle and the direction in which the wheel is pointing during a turn.

As used herein, the terms "symmetric steering linkage" and "symmetric linkage" are understood to mean a linkage that provides substantially the same toe angle changes for each font wheel in response to a given set of driving conditions (for example, jounce and rebound, roll angle, etc.) to which the wheels are exposed.

Figure 5:
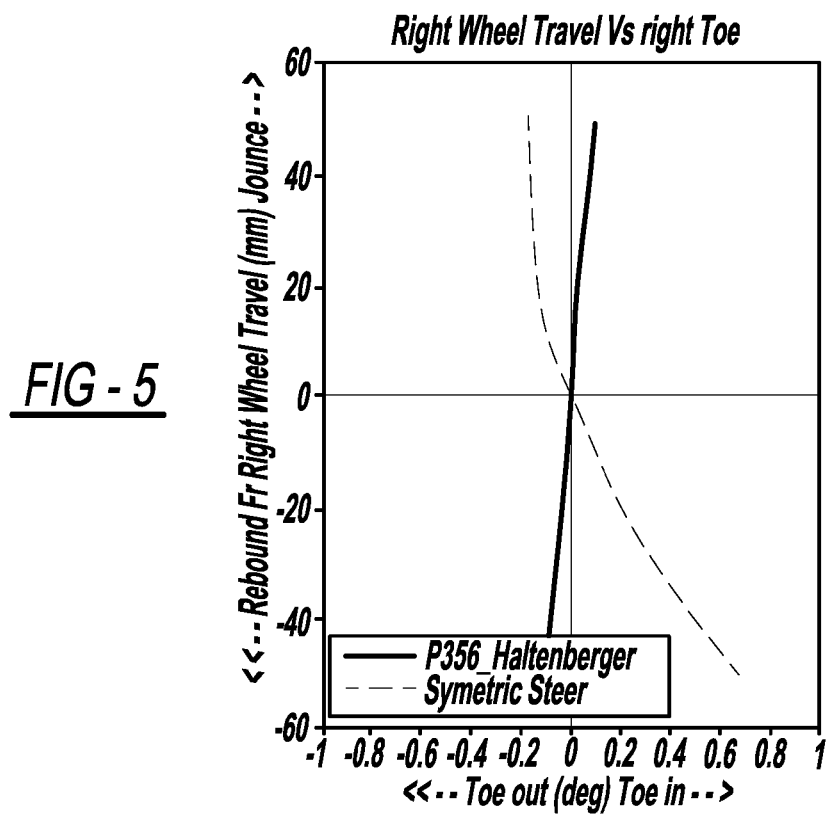
Figure 6:
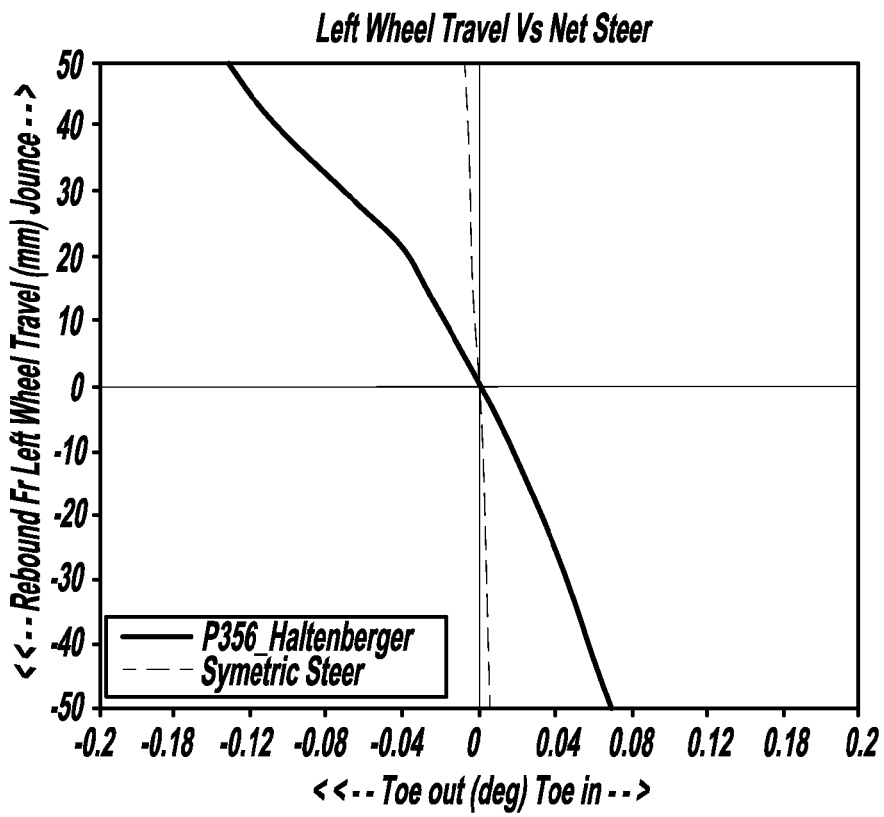

FIGS. 4 and 5 show changes in wheel toe of the left and right wheels of modeled test vehicles incorporating an optimized lateral linkage as shown in FIG. 11, as the twin I-beam suspension travels through simulated jounce and rebound. The figures show wheel toe values for a model incorporating a twin I-beam front suspension coupled to a reference Haltenberger steering linkage, and wheel toe values for a model incorporating a twin I-beam front suspension coupled to a steering linkage in accordance with an embodiment of the present invention. FIG. 6 shows a plot of the net steer effect produced on the left wheel of a modeled test vehicle by the Haltenberger linkage and a linkage in accordance with an embodiment of the present invention.

It may be seen from FIGS. 4 and 5 that the travel vs. toe curves for the symmetric linkage are substantially similar for both the left wheel and the right wheel. The differences between the travel vs. toe curves for the left and right wheels of the vehicle incorporating the Haltenberger linkage are also apparent from FIGS. 4 and 5.

In addition, it may be seen from FIG. 6 that the resultant net steer effect due to jounce and rebound in a vehicle incorporating a linkage embodiment of the present invention is reduced, in comparison to the vehicle incorporating the Haltenberger linkage.

Figure 7:
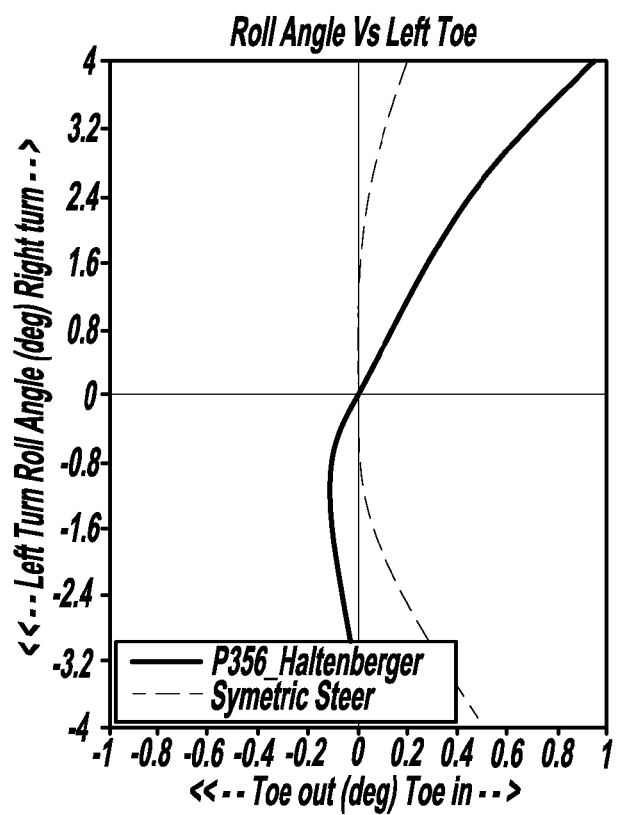
Figure 8:
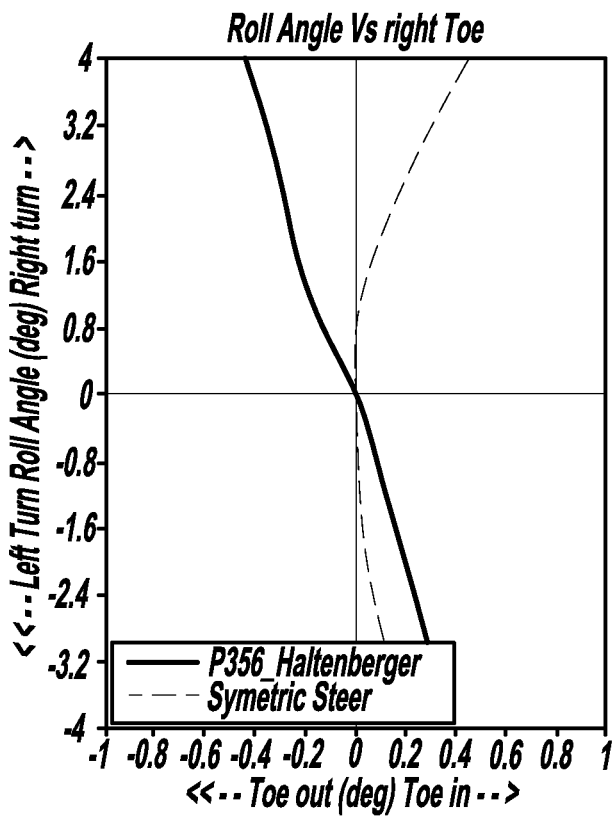
Figure 9:
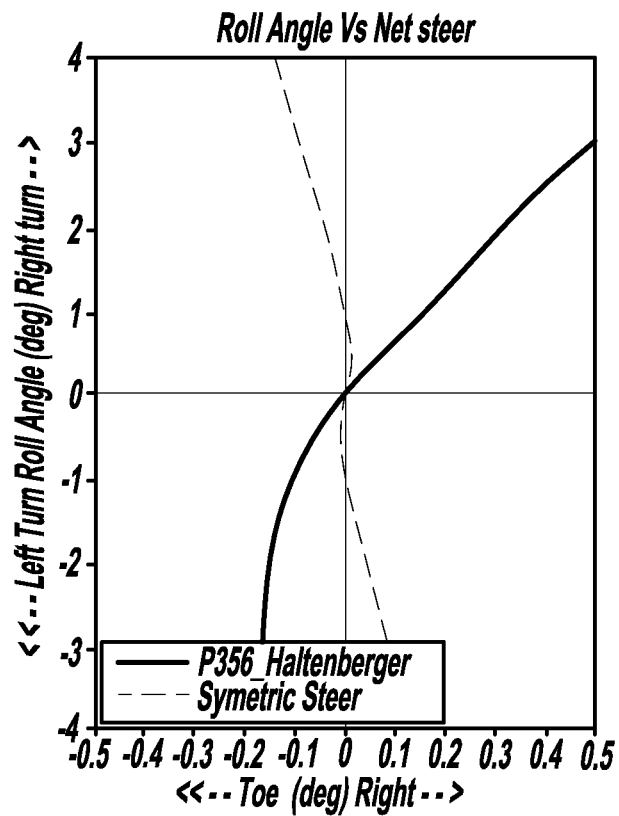

FIGS. 7 and 8 show changes in wheel toe of the left and right wheels of modeled test vehicles as the wheels are oriented at various roll angles during left turns and right turns. The figures show wheel toe values for a modeled vehicle incorporating a twin I-beam front suspension coupled to a Haltenberger steering linkage and wheel toe values for a modeled vehicle incorporating a twin I-beam front suspension coupled to a lateral steering linkage in accordance with an embodiment of the present invention. FIG. 9 shows plots of the net steer effect produced on test wheels of a model incorporating a Haltenberger linkage and a linkage in accordance with an embodiment of the present invention. It may be seen from FIGS. 7 and 8 that the roll angle vs. toe curves for the symmetric linkage are substantially similar for both the left wheel and the right wheel. In addition, it may be seen from FIG. 9 that the resultant net steer effect produced in a vehicle incorporating a linkage embodiment of the present invention at various roll angles of the tested wheel is substantially symmetrical about the graph x (i.e., roll angle) axis.

Figure 10:
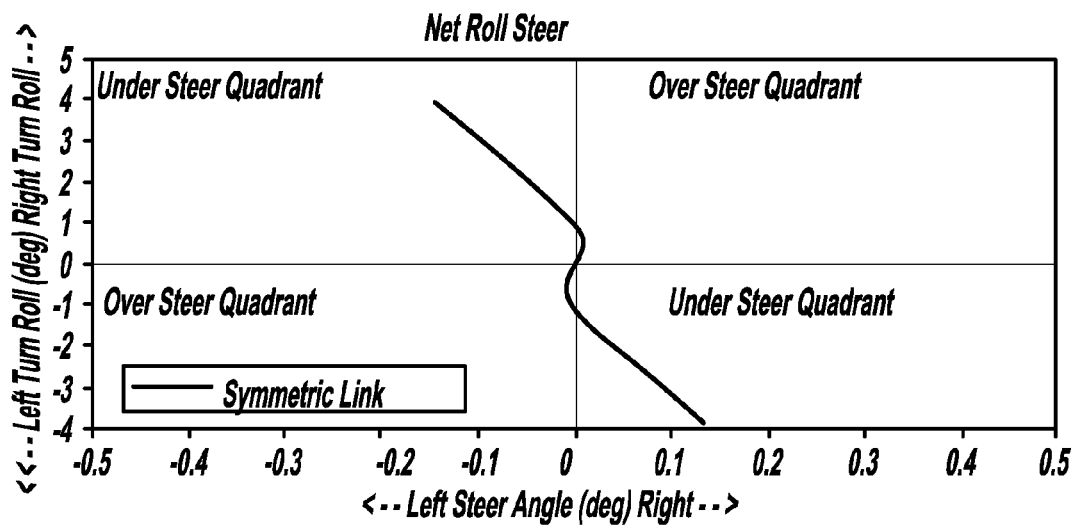

FIG. 10 shows a plot of steer angle vs. roll angle for a modeled lateral linkage in accordance with an embodiment of the present invention. It may be seen that use of the lateral linkage provides a predominant net understeer effect for a wide range of steer and roll angles. This net understeer effect enhances vehicle handling.

Thus, the linkage embodiment in accordance with the present invention provides a more uniform response of the left and right wheels to driving conditions, aids in minimizing net steer effects during in-phase wheel motion of the wheels, and contributes to a net understeer effect during out-of-phase motion of the wheels. The linkage elements are also relatively short and straight, reducing the likelihood of undesirable "slop" or compliance in the steering system elements. Thus, it may be seen that a lateral linkage in accordance with the present invention provides a means coupled to the suspension system and to the left and right front wheels for providing substantially equal wheel toe angle changes in the left front wheel and the right front wheel responsive to a given set of driving conditions.

It will be understood that the foregoing descriptions of various embodiments of the present invention is for illustrative purposes only. As such, the various structural and operational features herein disclosed are susceptible to a number of modifications, none of which departs from the scope of the present invention as defined in the appended claims.

What is claimed is:

1. An assembly comprising: a twin I-beam front suspension system; and a symmetric steering linkage operatively coupled to the suspension system, the linkage including a center link and first and second connecting members connected to the link, the first connecting member residing entirely on a first side of a plane bisecting a length of the link, and the second connecting member residing entirely on a second side of the plane opposite the first side; wherein the first connecting member is connected to the center link at a first location, the second connecting member is connected to the center link at a second location, and wherein the assembly further comprises a steering damper connected to the center link at a location that is not between the first and second locations.

2. The assembly of claim 1 wherein the first connecting member is connected to the center link at a first location, the second connecting member is connected to the center link at a second location, and wherein an effective spacing between the first and second locations is 210 mm.

3. The assembly of claim 2 further comprising a Pitman arm operatively connected to the center link at a third location, and wherein a spacing between the first and third locations is about 220 mm.

4. The vehicle of claim 3 further comprising an idler arm operatively connected to the center link at a fourth location, and wherein a spacing between the fourth and third locations is about 700 mm.

5. The assembly of claim 1 wherein the first connecting member comprises a Pitman arm, wherein the first and second connecting members extend from the center link to a first side of the center link, and wherein the Pitman arm extends from the center link to the first side of the center link to enable connection of a steering mechanism to the center link on the first side of the link.

6. The assembly of claim 5 wherein the steering linkage further comprises an idler arm operatively coupled to the center link, and wherein the idler arm extends from the center link to the first side of the center link to enable connection of a portion of vehicle to the center link on the first side of the link.

7. The assembly of claim 1 wherein an effective length of the first connecting member is about 674 mm.

8. The assembly of claim 1 wherein an effective length of the second connecting member is about 648 mm.

9. The assembly of claim 1 wherein the steering linkage further comprises an idler arm operatively coupled to the center link, wherein the first and second connecting members extend from the center link to a first side of the center link, and wherein the idler arm extends from the center link to the first side of the center link to enable connection of the portion of the vehicle to the center link on the first side of the link.

10. The assembly of claim 1 wherein the linkage is structured such that a toe angle of a vehicle wheel operatively coupled to the linkage is within the range −.04 degree (toe out) to +0.04 degree (toe in) for all values of wheel travel during jounce within the range −50 millimeters to +50 millimeters, inclusive.

11. The assembly of claim 1 wherein the linkage is structured such that a toe angle of a vehicle wheel operatively coupled to the linkage is within the range −0.1 degree (toe out) to +0.6 degree (toe in) for all values of vehicle roll angle within the range −4 degrees (during a vehicle left turn) to +4 degrees (during a vehicle right turn), inclusive.

12. The assembly of claim 1 wherein the linkage is structured such that a roll angle during a left turn of a vehicle wheel operatively coupled to the linkage has a value within the range −1.0 degree to −3.0 degrees, inclusive, when a value of a steer angle of the wheel during the turn is within the range 0 degree to 0.1 degree, inclusive, and wherein the linkage is structured such that a roll angle during a right turn of a vehicle wheel operatively coupled to the linkage has a value within the range 1.0 degree to 3.0 degrees, inclusive, when a value of a steer angle of the wheel during the turn is within the range 0 degree to −0.1 degree, inclusive.

13. A method for providing a steering linkage structured to provide wheel toe curves that are substantially the same for both first and second front wheels of a vehicle, the method comprising steps of: a) specifying connection locations, in three dimensional space, of a plurality of connection locations of the linkage, the plurality of connection locations including: a location of a connection between a first connecting member of the linkage and a center link of the linkage, a location of a connection between a second connecting member of the linkage and the center link, a location of a connection between a first pivoting member of the linkage and the center link, a location of a connection between a second pivoting member of the linkage and the center link; b) estimating if the linkage provides wheel toe curves that are substantially the same for both first and second front wheels of the vehicle responsive to steering inputs to the first and second wheels; c) if the linkage does not provide wheel toe curves that are substantially the same for both first and second front wheels of the vehicle responsive to steering inputs to the first and second wheels, moving at least one connection location of the plurality of connection locations; and d) repeating steps (a) through (c) until the linkage provides wheel toe curves that are substantially the same for both first and second front wheels of the vehicle responsive to steering inputs to the first and second wheels; wherein the first connecting member is connected to the center link at a first location, the second connecting member is connected to the center link at a second location, and wherein the assembly further comprises a steering damper connected to the center link at a location that is not between the first and second locations.

14. A vehicle comprising: a twin I-beam front suspension system; a steering linkage operatively coupled to the suspension system, the linkage including: a center link; a first connecting member positioned on a first side of a fore-aft axis of the vehicle and operatively coupling the center link to a first front wheel, the first connecting member being operatively coupled to the center link at a first connection; a second connecting member positioned on a second side of the fore-aft axis opposite the first side and operatively coupling the center link to a second front wheel, the second connecting member being operatively coupled to the center link at a second connection; a first pivoting member connecting the center link to a frame or chassis of the vehicle, the first pivoting member being operatively coupled to the center link at a third connection; and a second pivoting member connecting the center link to the frame or chassis, the second pivoting member being operatively coupled to the center link at a fourth connection, wherein the first and second connections are between the third and fourth connections, and wherein the first, second, third and fourth connections are positioned in space such that wheel toe curves are substantially the same for both first and second front wheels of the vehicle for each front wheel in response to a given set of driving conditions; and a steering damper connected to the center link at a location that is not between the first and second connections.

15. The vehicle of claim 14 wherein an effective spacing between the first and second connections is about 210 mm.

16. The assembly of claim 14 wherein an effective spacing between the first and third connections is about 220 mm.

17. The vehicle of claim 14 wherein the first and second connecting members extend from the center link to a first side of the center link to enable connection of first and second steering knuckles to the center link on a first side of the link, wherein the first pivoting member extends from the center link to the first side of the center link to enable connection of a steering mechanism to the center link on the first side of the link, and wherein the second pivoting member extends from the center link to the first side of the center link to enable connection of a portion of the vehicle to the center link on the first side of the link.

* * * * *